United States Patent

Shimizu et al.

[11] Patent Number: 5,991,452
[45] Date of Patent: Nov. 23, 1999

[54] IMAGE AND CODE DATA COMPRESSION APPARATUS

[75] Inventors: Masayoshi Shimizu; Takashi Morihara; Tsugio Noda, all of Kawasaki, Japan

[73] Assignee: Fujitsu Limited, Kawasaki, Japan

[21] Appl. No.: 08/889,047

[22] Filed: Jul. 7, 1997

Related U.S. Application Data

[63] Continuation of application No. 08/208,401, Mar. 10, 1994, abandoned.

[30] Foreign Application Priority Data

Apr. 2, 1993 [JP] Japan ................................ 5-076541

[51] Int. Cl.⁶ ...................................................... G06K 9/36
[52] U.S. Cl. ................................................................ 382/248
[58] Field of Search .................................... 382/248, 250, 382/251, 253; 358/426, 432, 433; 348/384, 387, 390, 392

[56] References Cited

U.S. PATENT DOCUMENTS

| | | | |
|---|---|---|---|
| 4,805,030 | 2/1989 | Tanaka | 358/260 |
| 5,038,389 | 8/1991 | Mizuno | 382/248 |
| 5,046,121 | 9/1991 | Yonekawa et al. | 382/56 |
| 5,051,840 | 9/1991 | Watanabe et al. | 358/433 |
| 5,086,488 | 2/1992 | Kato et al. | 382/56 |
| 5,121,216 | 6/1992 | Chen et al. | 358/261.3 |
| 5,126,842 | 6/1992 | Andrews et al. | 358/133 |

FOREIGN PATENT DOCUMENTS

| | | |
|---|---|---|
| 0 296 608 | 12/1988 | European Pat. Off. . |
| 0 502 545 | 9/1992 | European Pat. Off. . |
| 2-105791 | 4/1990 | Japan . |

*Primary Examiner*—Yon J. Couso
*Attorney, Agent, or Firm*—Staas & Halsey

[57] ABSTRACT

In an image and code data compression apparatus for compressing the image data and further compressing the code data which are compressed from the image data, the apparatus includes: a dividing unit for receiving the image data and dividing them into a plurality of image data blocks; a transformation unit operatively connected to the dividing unit for performing an orthogonal transformation to the image data block and calculating transformation coefficients for every frequency component; a quantizing unit operatively connected to the transformation unit for quantizing the transformation coefficients which are calculated by the transformation unit by using a quantized threshold value which is set commonly to all image data, and calculating the quantized orthogonal transformation coefficients; a coding unit operatively connected to the quantizing unit for performing the variable length coding process for the quantized transformation coefficients which are calculated by the quantizing unit and outputting the code data which are compressed from the image data; a detecting unit operatively connected to at least one of above units for detecting the complexity of the image data block; and a deleting unit operatively connected to at least one of above units and the detecting unit for deleting the block image data having high complexity detected by the detecting unit.

34 Claims, 11 Drawing Sheets

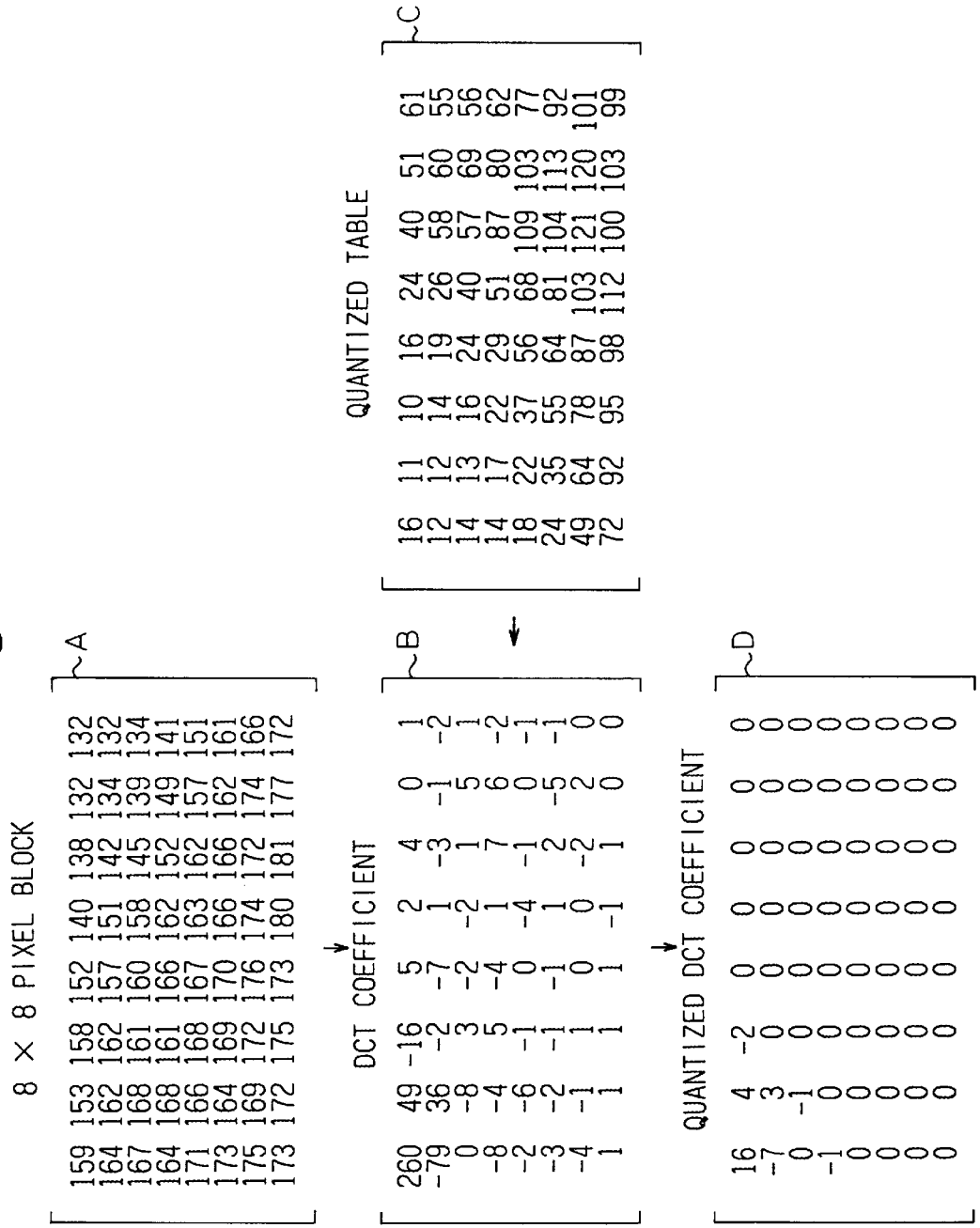

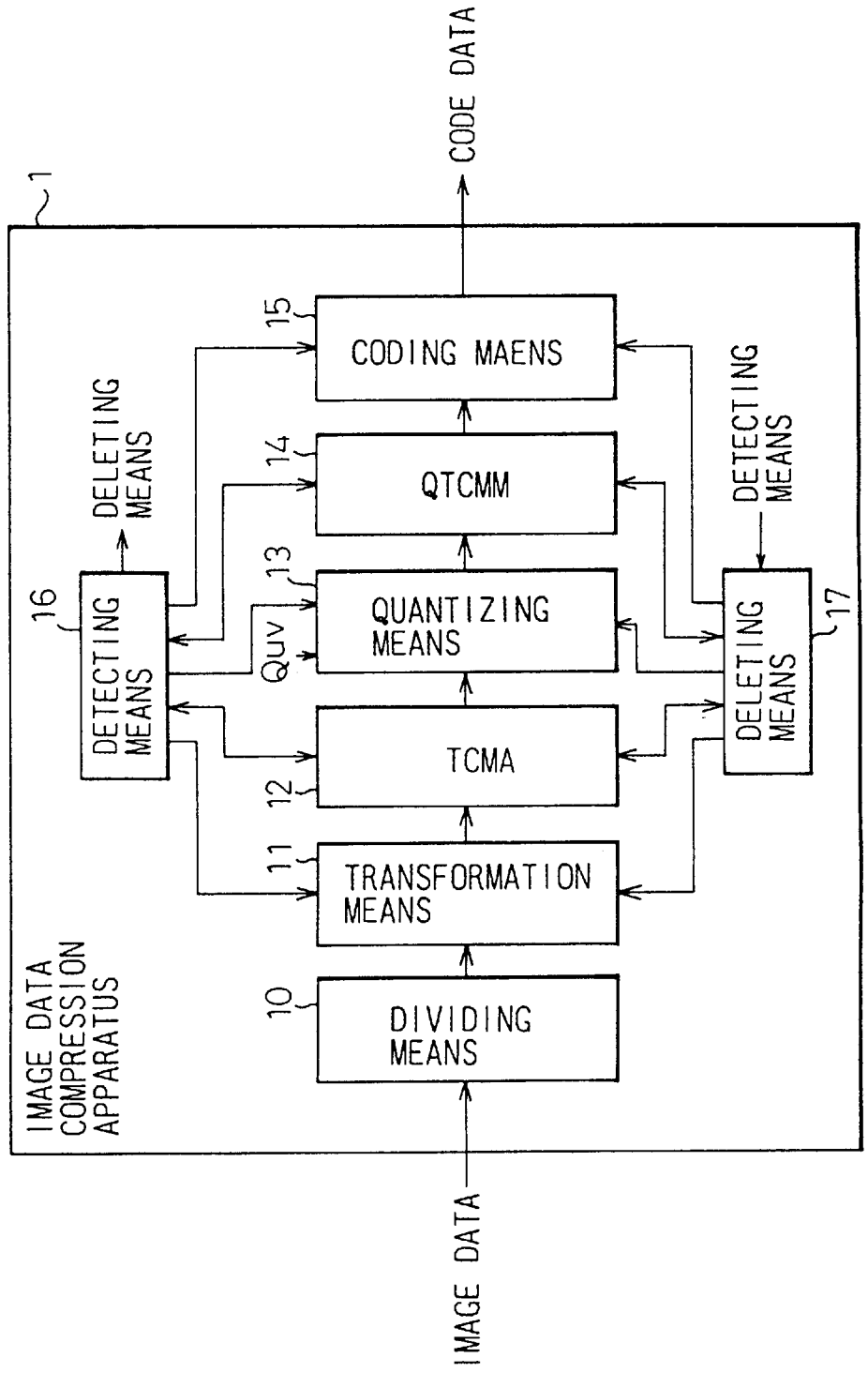

IMAGE AND CODE DATA COMPRESSION APPARATUS

This application is a continuation, of application Ser. No. 08/208,401, filed Mar. 10, 1994, now abandoned.

BACKGROUND OF THE INVENTION

1. Field of the Invention

The present invention relates to an image and code data compression apparatus formed of an image data compression apparatus and a code data compression apparatus. More particularly, the image data compression apparatus is provided for compressing the image data in accordance with an orthogonal transformation and obtaining code data after compression of the image data, and the code data compression apparatus is provided for further compressing the code data in accordance with the orthogonal transformation and obtaining re-compressed code data after compression of the code data.

The image and code data compression apparatus according to the present invention can realize a high data compression rate in accordance with an algorithm for a compression method which is defined by JPEG (Joint Photographic Experts Group).

2. Description of the Related Art

As a method for compressing image and code data using an orthogonal transformation, an algorithm for compression was standardized by JPEG which was jointly organized by the International Standardization Organization (i.e., ISO) and the Comite Consultatif International Telegraphique et Telephonique (i.e., CCITT).

Such an algorithm is described, for example, in "JPEG, DIS 10918 DIGITAL COMPRESSION AND CODING OF CONTINUOUS-TONE STILL IMAGES, PART I REQUIREMENTS AND GUIDELINES". According to this document, image data are divided into a plurality of image data blocks, and each image data block is processed in accordance with a known DCT (Discrete Cosine Transformation) to calculate a DCT coefficient (below, transformation coefficient). Further, the calculated transformation coefficients are quantized to obtain quantized transformation coefficients. Still further, the quantized transformation coefficients are processed, in order, from a low frequency to a high frequency in accordance with a variable length coding process to realize compression of the image data.

In this case, the variable length coding process is performed for data which sums up the number of the quantized transformation coefficients having nonzero value and the number of the quantized transformation coefficients continuing just before the nonzero value.

When improving the above conventional method of image data compression which complies with the JPEG standard, basically, it is necessary to ensure the code data which can decode the image data by using a standardized decoding algorithm to realize an improved image data compression method.

SUMMARY OF THE INVENTION

The object of the invention is to provide an image and code data compression apparatus enabling high data and code compression rates.

In accordance with one aspect of the present invention, there is provided an image data compression apparatus for compressing the image data, the apparatus including:

a dividing unit for receiving the image data and dividing them into a plurality of image data blocks;

a transformation unit operatively connected to the dividing unit for performing an orthogonal transformation to the image data blocks and calculating transformation coefficients for every frequency component;

a quantizing unit operatively connected to the transformation unit for quantizing the transformation coefficients which are calculated by the transformation unit by using a quantized threshold value which is set commonly to all image data, and calculating the quantized orthogonal transformation coefficients;

a coding unit operatively connected to the quantizing unit for performing the variable length coding process for the quantized transformation coefficients which are calculated by the quantizing unit, and outputting the code data which are compressed from the image data;

a detecting unit operatively connected to at least one of units for detecting complexity of the image data block; and a deleting unit operatively connected to at least one of units and the detecting a part of unit for deleting a part of the image data block having high complexity detected by the detecting unit.

In one preferred embodiment, the deleting unit deletes a part of the image data block by selecting the transformation coefficients calculated by the transformation means.

In another preferred embodiment, the deleting unit deletes a part of the image data block by selecting the transformation coefficients by stopping the orthogonal transformation processes which are executed by the transformation means.

In still another preferred embodiment, the deleting unit does not select the transformation coefficients by uniformly deleting the transformation coefficients having a high frequency component, and selects the transformation coefficients having the high frequency component in accordance with a predetermined reference.

In still another preferred embodiment, the deleting unit deletes a part of the image data block by selecting the transformation coefficients indicating a large absolute value within the transformation coefficients which are calculated by the transformation unit.

In still another preferred embodiment, the deleting unit always selects the transformation coefficients having a direct current component and a predetermined low frequency component.

In still another preferred embodiment, the deleting unit deletes a part of the image data block by selecting the quantized transformation coefficients calculated by the quantized transformation unit.

In still another preferred embodiment, the deleting unit deletes a part of the image data block by selecting the quantized transformation coefficients by stopping the quantizing processes which are executed by the quantizing unit.

In still another preferred embodiment, the deleting unit does not select the quantized transformation coefficients by uniformly deleting the quantized transformation coefficients having a high frequency component, and selects the quantized transformation coefficients having the high frequency component in accordance with a predetermined reference.

In still another preferred embodiment, the deleting unit deletes a part of the image data block by selecting the transformation coefficients indicating a large absolute value within the quantized transformation coefficients which are calculated by the quantizing unit.

In still another preferred embodiment, the deleting unit always selects the quantized transformation coefficients having a direct current component and a predetermined low frequency component.

In still another preferred embodiment, the deleting unit deletes a part of the image data block by selecting code data generated by the coding unit.

In still another preferred embodiment, the deleting unit deletes the image data block by selecting the code data by stopping the coding processes which are executed by the coding unit.

In still another preferred embodiment, the deleting unit does not select the code data by uniformly deleting the code data having a high frequency component, and selects the code data having the high frequency component in accordance with a predetermined reference.

In still another preferred embodiment, the detecting unit counts the number of the transformation coefficients in which absolute values of the transformation coefficient exceed a threshold value which is set corresponding to the transformation coefficients, and detects the complicated image data when a counted value exceeds a predetermined reference value.

In still another preferred embodiment, the detecting unit calculates a sum of n-th power (n: rational number) of the absolute value of the transformation coefficient, and detects the complicated image data when a calculated value exceeds a predetermined reference value.

In still another preferred embodiment, the detecting unit counts the quantized transformation coefficients in which absolute values of the quantized transformation coefficient exceed a threshold value which is set corresponding to the quantized transformation coefficients, and detects the complicated image data when a counted value exceeds a predetermined reference value.

In still another preferred embodiment, the detecting unit calculates a sum of n-th power (n: rational number) of the absolute value of the quantized transformation coefficient, and detects the complicated image data when calculated value exceeds a predetermined reference value.

In still another preferred embodiment, the detecting unit detects the complicated image data when a sum of the code length of the code data is larger than a predetermined reference value.

In still another preferred embodiment, the detecting unit uses the absolute values weighted by the frequency when summing the absolute values.

In accordance with another aspect of the present invention, there is provided a code data compression apparatus for compressing the code data; the apparatus including a detecting unit for receiving the code data and detecting the complexity of the image data block; and a deleting unit for receiving the code data and deleting a part of the image data block having high complexity detected by the detecting unit.

In one preferred embodiment, the deleting unit remains valid code data which are contained in the predetermined code amount in which the direct current component is defined as a start point.

In another preferred embodiment, the deleting unit does not uniformly delete the high frequency components of the code data, and remains the valid code data having the high frequency component in accordance with a predetermined reference.

In accordance with still another aspect of the present invention, there is provided a code data compression apparatus, the apparatus including a detecting unit for receiving the code data and detecting complexity of the image data block; a restoring unit for receiving the code data and restoring the quantized transformation coefficients as to the image data block having high complexity detected by the detecting unit; a selecting unit operatively connected to the restoring unit for selecting the quantized transformation coefficients which are restored by the restoring unit; and a re-coding unit operatively connected to the selecting unit for performing the variable length coding process as to the quantized transformation coefficients which are selected by the selecting unit.

In one preferred embodiment, the selecting unit selects the quantized transformation coefficient having a large absolute value within the quantized transformation coefficients which are restored by the restoring unit.

In another preferred embodiment, the selecting unit always selects the quantized transformation coefficient having a direct current component and the predetermined low frequency component.

In accordance with still another aspect of the present invention, there is provided a code data compression apparatus, the apparatus including detecting unit for receiving the code data and detecting complexity of the image data block; a restoring unit for receiving the code data and restoring the transformation coefficients as to the image data block having high complexity detected by the detecting unit by using a quantized threshold value which is set commonly to all image data; a selecting unit operatively connected to the restoring unit for selecting the transformation coefficients which are restored by the restoring unit; re-quantizing unit operatively connected to the selecting unit for quantizing the transformation coefficients which are selected by the selecting unit by using the quantized threshold value which are set commonly to all image data; and re-coding unit operatively connected to the requantizing unit for performing the variable length coding process as to the quantized transformation coefficients which are calculated by the re-quantizing unit.

In one preferred embodiment, the selecting unit selects the transformation coefficients having large absolute values within the transformation coefficients which are restored by the restoring unit.

In another preferred embodiment, the selecting unit always selects the transformation coefficients having direct current components and the predetermined low frequency components.

In still another preferred embodiment, the detecting unit detects the complicated image when a sum of the code lengths of the code data is larger than the predetermined reference value.

In still another preferred embodiment, the detecting unit detects the complicated image when the number of the quantized transformation coefficients indicating a nonzero value which is defined by the code data is larger than the predetermined reference value.

BRIEF DESCRIPTION OF THE DRAWINGS

In the drawings:

FIG. 1 is an explanatory view of a deriving process of quantized DCT coefficients;

FIG. 2 is a basic block diagram of an image data compression apparatus according to the present invention;

DESCRIPTION OF THE PREFERRED EMBODIMENTS

Figure 3A:
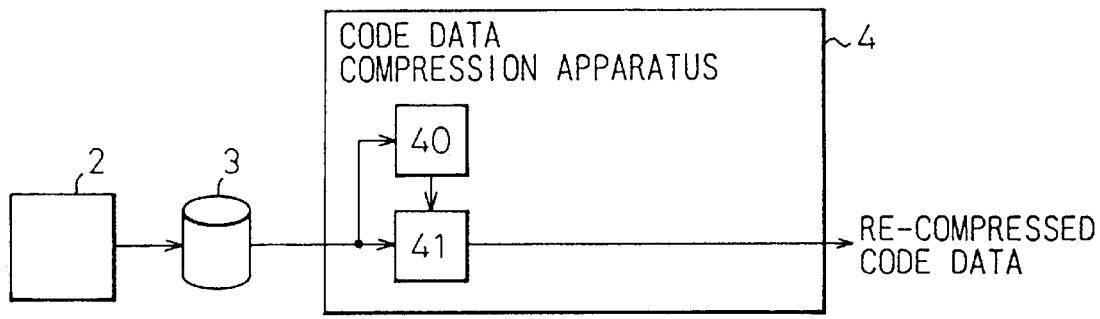
FIGS. 3A to 3C are basic block diagrams of a code data compression apparatus according to the present invention.

Before describing the preferred embodiments, a basic technique of an image and code data compression method will be explained in detail below.

FIG. 1 is an explanatory view of a deriving process of quantized DCT coefficients. In the drawing, reference letter A denotes a table of a pixel block having 8×8 pixels each of which represents a gradation value of the pixel. In this case, the large gradation value represents white color, and the small one represents black color. Reference letter B denotes a table of the DCT coefficient which is calculated from the pixel block 1 using a known Discrete Cosine Transformation. Reference number C denotes a quantized table formed of a plurality of quantized threshold values. Reference number D denotes a table of the quantized DCT coefficient. Briefly, each value of the quantized DCT coefficient table D is obtained by dividing the DCT coefficient by the quantized threshold value.

That is, the DCT (Discrete Cosine Transformation) is performed on each of pixels in the pixel block A to obtain the DCT coefficient $S_{uv}$ by using the DCT. Next, the each DCT coefficient $S_{uv}$ is divided by the quantized threshold value $Q_{uv}$, which is stored in the quantized table C. Finally, an integer value adjacent to the result of $S_{uv} \div Q_{uv}$ is defined as the quantized DCT coefficient as shown by the table D. For example, numerals "16", "4", "−2", etc., are called "nonzero values", and "0" is called a zero value.

In the above explained JPEG image data compression method, the quantized threshold values in the quantized table D are commonly utilized for all image data blocks. This is because, if the change of the quantized threshold values are permitted for every image data block, it is necessary to inform all changes of the quantized threshold values to the decoding side.

On the other hand, all image data have partially different characters in one image data block. For example, when the image data include a light/shade portion (i.e., the change of the image is noticeable, for example, an image of sky, mountain and valley) and a flat portion (i.e., the changes of the image are small, for example, only sky and cloud), the grade of deterioration (i.e., quality of the compressed image) is different between the light/shade portion and the flat portion when compressing the image data.

Accordingly, it is difficult to recognize the change of the pixel value at the light/shade portion because the change of the pixel value is masked by adjacent pixel values due to complicated change of the image data. On the contrary, it is easy to recognize the change of the pixel value at the flat portion because the change of the pixel value is not masked by the adjacent pixel values.

In a conventional art disclosed in the Japanese Unexamined Patent Publication No. 2-105792 (below, JPP-2-105792), when compressing the image data in accordance with the orthogonal transformation, fine quantized threshold values are used for the flat portion to ensure the quality of the compressed image data, and coarse quantized threshold values are used for the light/shade portion to prevent excessive quality of the image in accordance with the change of the image data. This means that, if the fine quantized threshold values are used for the light/shade portion, it becomes unnecessary and excessive quality.

However, according to the invention disclosed in the JPP-2-105792, when decoding the image data, it is necessary to pass the quantized threshold values, which are used for the quantizing process, to a decoding device for every quantizing operation.

In this case, it is difficult to use the decoding device which is defined by JPEG. This is because the decoding device, which operates in accordance with the algorithm defined by JPEG, does not provide a structure which can decode the image data by switching the quantized threshold values for every block image data.

Further, according to the above citation (JPP-2-105792), since the quantized threshold values must be switched for every image data block in the coding device, as a result, very complex calculations are required in the decoding device.

In order to solve above problems, according to the first aspect of the present invention, there is provided an improved image data compression apparatus which can realize high data compression rate when compressing the image data using the orthogonal transformation in accordance with the algorithm defined by JPEG, and can output the code data which can decode by using the decoding algorithm defined by JPEG.

Further, according to another aspect of the present invention, there is provided an improved code data compression apparatus which can realize a high compression rate when compressing code data by using the orthogonal transformation in accordance with the algorithm defined by JPEG, and can decode by using the decoding algorithm also defined by JPEG. In this case, the code data are obtained by compressing the image data.

Figure 3B:
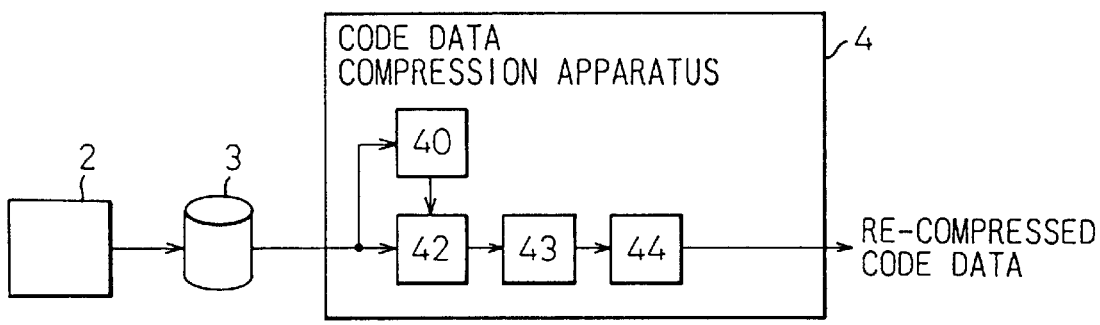
Figure 3C:
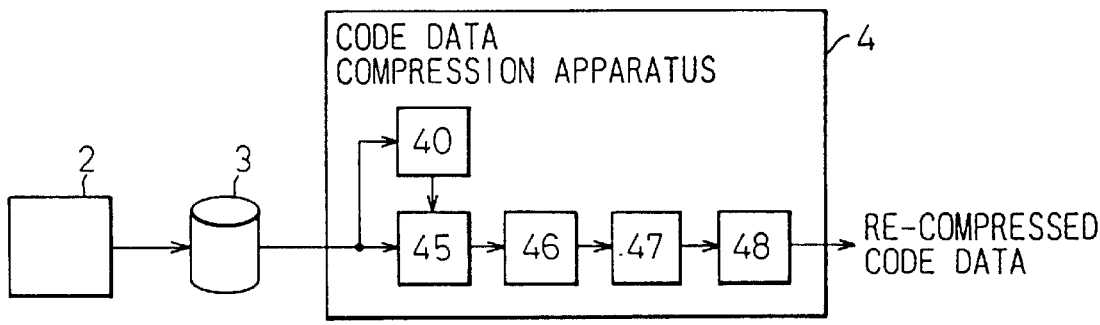

FIG. 2 is a basic block diagram of the image data compression apparatus according to the present invention, and FIGS. 3A to 3C are basic block diagrams of the code data compression apparatus according to the present invention. Preferably, the image and code data compression apparatus according to the present invention is formed by combining the image data compression apparatus of FIG. 2 with the code data compression apparatus of FIGS. 3A to 3C.

In FIG. 2, reference number 1 denotes the image data compression apparatus according to the present invention. The image data compression apparatus 1 comprises a dividing means 10, a transformation means 11, a transformation coefficient managing area (below, TCMA) 12, a quantizing means 13, a quantizing transformation coefficient managing means (below, QTCMM) 14, a coding means 15, a detecting means 16, and a deleting means 17.

The dividing means 10 receives the image data and divides the image data into a plurality of image data blocks. The transformation means 11 performs the orthogonal transformation to each image data block to calculate the transformation coefficients for every frequency component. The TCMA 12 is provided for managing the transformation coefficients which are calculated by the transformation means 11. The quantizing means 13 performs the quantizing operation to the transformation coefficients to calculate the quantized transformation coefficients using the quantized threshold values Quv which are set commonly to all image data.

The QTCMM 14 manages the quantized transformation coefficients which are calculated by the quantized means 13. The coding means 15 generates the code data by performing the variable length coding process to the quantized transformation coefficients which are calculated by the quantized means 13. The detection means 16 detects the complexity of the image data block. As explained above, "complexity" means the grade of the image data including the light/shade portion and the flat portion. The deleting means 17 performs deletion of image data having high complexity.

In FIGS. 3A to 3C, reference number 2 denotes an image data compression apparatus of FIG. 2. Reference number 3 denotes an image code file for temporarily storing the code data which are output from the image data compression apparatus. Reference number 4 denotes a code data compression apparatus according to the present invention to compress the code data stored in the image code file 3.

Preferably, the code data compression apparatus 4 is provided for further compressing the code data which are compressed by the image data compression apparatus 2. As shown in FIGS. 3A to 3C, the code data compression apparatus can provide three types of data in accordance with the grade of re-compressed code data as explained in detail below.

In FIG. 3A, this type of the code data compression apparatus 4 includes a detecting means 40 and a deleting means 41. The detecting means 40 receives the code data and detects the complexity thereof. The deleting means 41 deletes the code data having high complexity, and outputs the re-compressed code data therefrom after deletion of the complicated code data.

In FIG. 3B, this type of the code data compression apparatus 4 includes the detecting means 40, a restoring means 42, a selecting means 43, and a re-coding means 44. The restoring means 42 restores the quantized transformation coefficients to the image data blocks (code data) having high complexity which are detected by the detecting means 40. The selecting means 43 selects the quantized transformation coefficients which are restored by the restoring means 42. The re-coding means 44 performs the variable length coding process for the quantized transformation coefficients which are selected by the selecting means 43.

In FIG. 3C, this type of the code data compression apparatus 4 includes the detecting means 40, a restoring means 45, a selecting means 46, a re-quantizing means 47, and a re-coding means 48. The restoring means 45 restores the transformation coefficients of the block image data having high complexity using the quantized threshold values which are set commonly to all image data. The selecting means 46 selects the transformation coefficients which are restored by the restoring means 45. The re-quantizing means 47 quantizes the transformation coefficients, which are selected by the selecting means 46, using the quantized threshold values which are set commonly to all image data. The re-coding means 48 performs the variable length coding process for the quantized transformation coefficients which are calculated by the re-quantizing means 47.

In the image data compression apparatus 1 shown in FIG. 2, the detecting means 16 refers to the transformation coefficients generated by the transformation means 11 and the transformation coefficients expanded by the TCMA 12, and counts the number of the transformation coefficients in which absolute values thereof exceed threshold values which are set for every transformation coefficient. Further, when the counted values exceed a predetermined reference value, the detecting means 16 recognizes that the image is complicated.

Still further, the detecting means 16 calculates a sum of n-th power of the absolute values of the transformation coefficients (in this case, n denotes a rational number). When the absolute values exceed the reference value, the detecting means 16 recognizes that the image is complicated. In this case, the detecting means 16 may use the transformation coefficients which are weighted in accordance with the frequency when adding the absolute values.

When detecting means 16 detects the complicated image data block using the transformation coefficients, the deleting means 17 performs deletion of the image data by selecting the transformation coefficients which are calculated by the transformation means 11, or by selecting the quantized transformation coefficients which are calculated by the transformation means 11, or by selecting the code data which are calculated by the coding means 15.

That is, for example, the deleting means 17 performs deletion of the image data in such a way that the deletion means 17 stops the orthogonal transformation processes which are executed by the transformation means 11 and selects the transformation coefficients, selects the large absolute values from the transformation coefficients which are calculated by the transformation means 11, and sets the transformation coefficients which are not selected, to zero.

Further, for example, the deleting means 17 performs deletion of the image data in such a way that the deletion means 17 stops the quantization processes which are executed by the quantizing means 13 and selects the quantized transformation coefficients, selects the large absolute values from the quantized transformation coefficients which are calculated by the quantizing means 13, and sets the quantized transformation coefficients which are not selected, to zero.

In the above process which stops the orthogonal transformation process or the quantization process, all high frequency components are not deleted uniformly, and for example, only high frequency components having large absolute values may be selected in accordance with a predetermined reference value. Further, when selecting the large absolute values, direct current components and low frequency components can be always selected although they do not indicate large absolute values.

The detecting means 16 refers to the quantized transformation coefficients which are generated by the quantizing means 13 and the quantized transformation coefficients which are expanded by the QTCMM 14, and counts the number of the transformation coefficients in which the absolute values of the quantized transformation coefficients exceed the threshold values which are set for every quantized transformation coefficients. When the counted value exceeds the reference value, the detecting means 16 recognizes that the image is complicated.

Further, the detecting means 16 calculates the sum of n-th power of the absolute values of the quantized transformation coefficients. When the calculated value exceeds the reference value, the detecting means 16 recognizes that the image is complicated. When processing the above summing operation, the detecting means 16 employs the transformation coefficients which are weighted in accordance with the frequency when summing the absolute values.

When the detecting means 16 detects the complicated block image data by using the quantized transformation coefficients, the deleting means performs deletion of the image data by selecting the quantized transformation coefficients which are calculated by the quantizing means 13, or by selecting the code data which are generated by the coding means 15.

That is, the deleting means 17 performs deletion of the code data in such a way that the deleting means 17 selects the quantized transformation coefficients by stopping the quantizing processes which are executed in the quantizing means 13, selects the large absolute values from the quantized transformation coefficients which are calculated by the quantizing means 13, and sets the quantized transformation coefficients, which are not selected, to the zero value. Further, the deleting means 17 performs deletion of the code data by stopping the coding processes which are executed in the coding means 15.

In the above process which stops the quantization process, all high frequency components are not deleted uniformly, and for example, only high frequency components having large absolute values may be selected in accordance with the predetermined reference value. Further, when selecting the large absolute values, direct current components and low frequency components may be always selected although they do not indicate large absolute values.

Further, when a sum of the code lengths which are generated by the coding means 15 indicate the values larger than the reference value, the detecting means 16 recognizes that the image is complicated. When processing the above summing, the detecting means 16 employs transformation coefficients which are weighted in accordance with the frequency.

As explained above, when the detecting means 16 detects the complicated image data block by using the code length, the deleting means 17 performs deletion of the code data by selecting the code data which are generated by the coding means 15.

That is, the deleting means 17 performs deletion of the code data in such a way that the deleting means 17 stops the coding processes which are executed in the coding means 15, and selects the code data.

In the above process which stops the coding process, all high frequency components are not deleted uniformly and, for example, a half of the high frequency components may be selected in accordance with the predetermined reference value.

In the code data compression apparatus 4 in FIG. 3A, when a sum of the code length of the code data which are sent from the image code file 3 is larger than the threshold values, the detecting means 40 recognizes that the code data is complicated. Further, when the number of the quantized transformation coefficients which indicate the nonzero value are larger than the threshold values, the detecting means 40 recognizes that the code data is complicated.

When the detecting means 40 recognizes that the code data is complicated, the deleting means 41 performs deletion of the code data in such a way that the deleting means 41 retains the code data which are contained within a predetermined code amount, which is defined by the direct current component as a start point, as valid code data, and deletes other code data except for the above valid code data.

In the above process, all high frequency components are not deleted uniformly, and for example, the code data having the high frequency components may be retained as valid code data.

In the code data compression apparatus 4 in FIG. 3B, the restoring means 42 restores the quantized transformation coefficients of the complicated block image data by using the quantized threshold values which are set commonly to all images. The selecting means 43 retains the large absolute values within the restored quantized transformation coefficients, and selects other quantized transformation coefficients except for the above by setting to the zero value. The re-coding means 44 performs the variable length coding process to the selected quantized transformation coefficients. At that time, the selecting means 43 always selects the quantized transformation coefficients having direct current components and the low frequency components regardless of the large absolute values.

In the code data compression apparatus 4 in FIG. 3C, the restoring means 45 restores the transformation coefficients of the complicated image data block by using the quantized threshold values which are set commonly to all images. The selecting means 46 retains the large absolute values within the restored transformation coefficients, and selects other transformation coefficients, except for the above, by setting to zero.

Further, the re-quantizing means 47 quantizes the selected transformation coefficients by using the quantized threshold values which are set commonly to all image data. The re-coding means 48 performs the variable length coding process as to the selected quantized transformation coefficients. At that time, the selecting means 46 always selects the quantized transformation coefficients having direct current components and the frequency components regardless of large absolute values.

Figure 4:
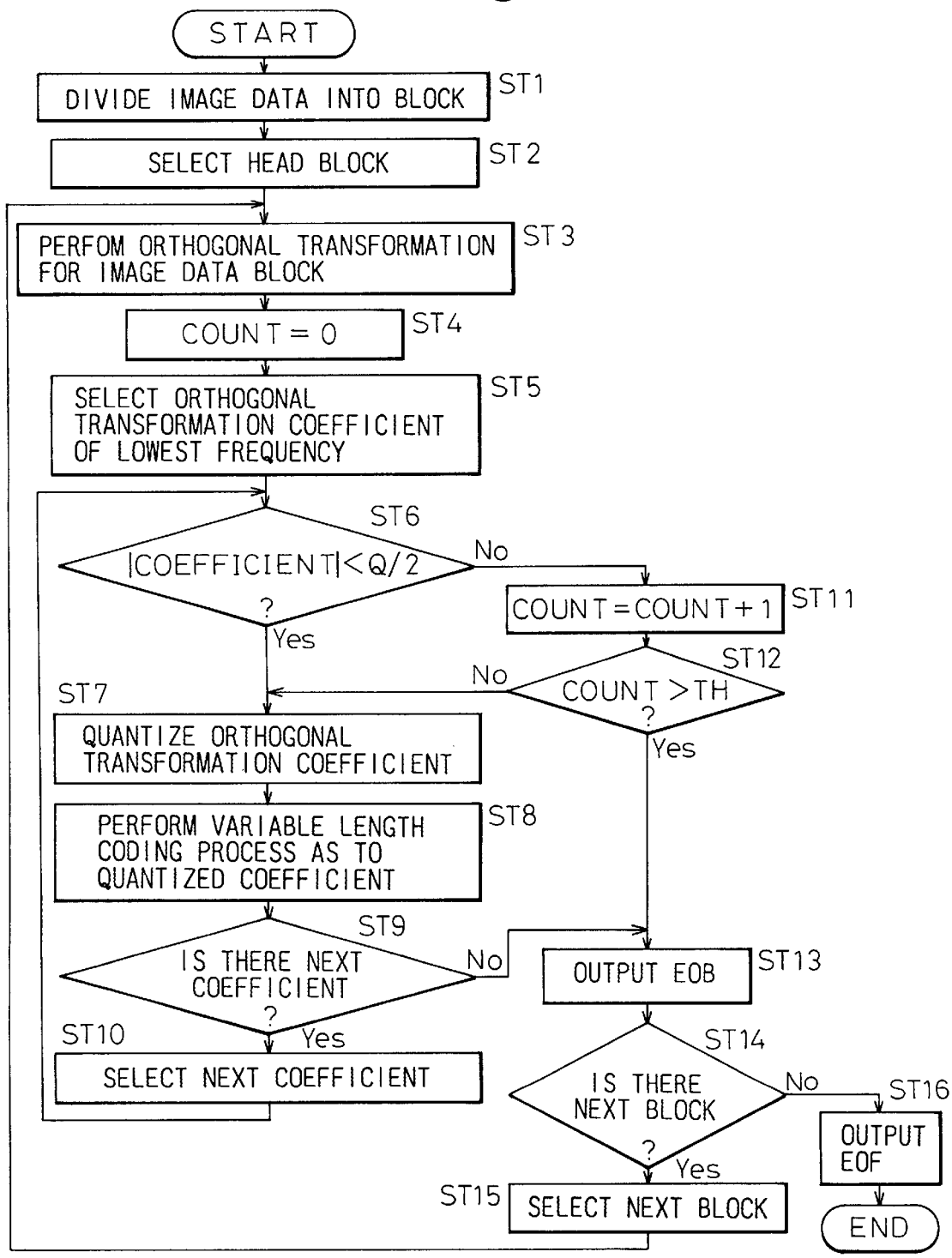
FIG. 4 is a flowchart of operation of the image data compression apparatus according to an embodiment of the present invention.
Figure 5:
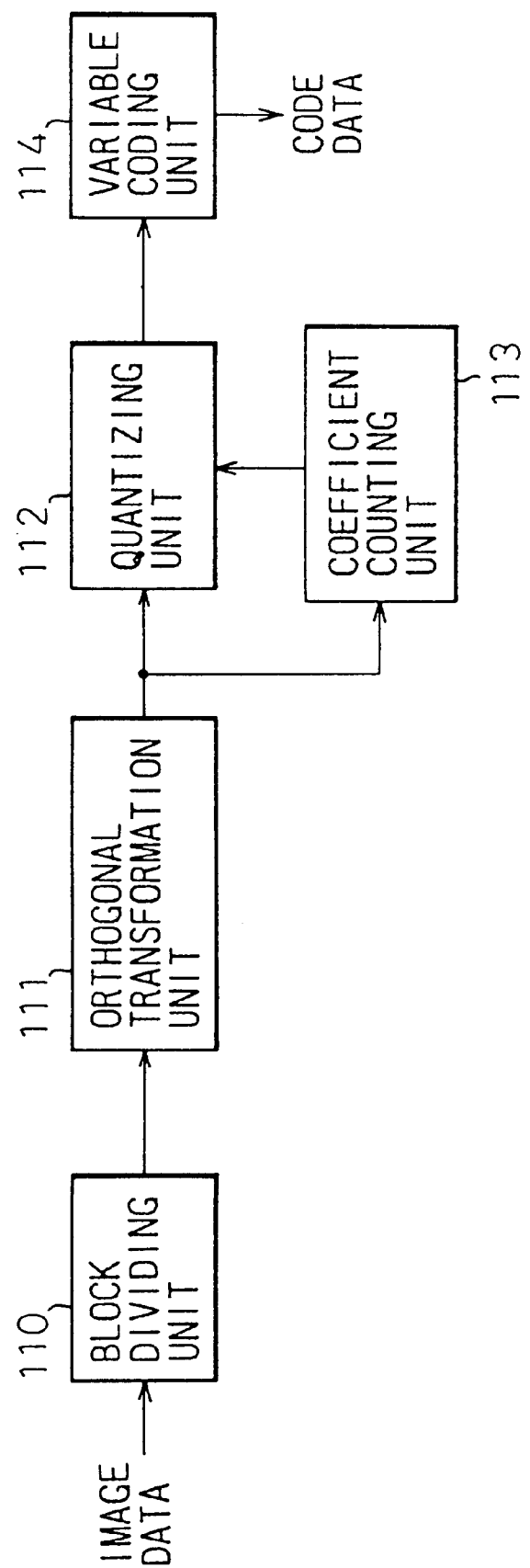
FIG. 5 is a functional view for explaining a flowchart shown in FIG. 4.

FIG. 4 is a flowchart of the operation of the image data compression apparatus according to an embodiment of the present invention, and FIG. 5 is a functional view for explaining the flowchart shown in FIG. 4.

The flowchart will be explained with reference to FIG. 5. In the image data compression apparatus 1, the block dividing unit 110 receives the image data, and divides the image data into a plurality of block image data (step ST1). The orthogonal transformation unit 111 selects the first (head) image block from the block image data (step ST2), and performs the orthogonal transformation as to the block image data which is selected in step ST2 (step ST3).

The coefficient count unit 113 receives an instruction which initializes the orthogonal transformation coefficients from the orthogonal transformation unit 111, and sets a variable number (COUNT) to zero (step ST4). Further, the coefficient count unit 113 selects the orthogonal transformation coefficient at the lowest frequency (step ST5), and outputs the selected orthogonal transformation coefficient to the quantizing unit 112.

The quantizing unit 112 receives the orthogonal transformation coefficient selected by the coefficient count unit 113, and determines whether or not an absolute value of the selected orthogonal transformation coefficient is larger than a half of the quantized threshold value (step ST6). When the absolute value is smaller than half of the quantized threshold value (YES, in step ST6), the quantizing unit 112 quantizes the orthogonal coefficient in accordance with the quantized threshold value (step ST7). Further, the variable length coding unit 114 performs the variable length coding process for the quantized orthogonal transformation coefficient (step ST8).

Further, the quantizing unit 112 determines whether or not there is a next orthogonal transformation coefficient (step ST9). When there is a next orthogonal transformation coefficient (YES, in step ST9), the quantizing unit 112 selects the next orthogonal transformation coefficient (step ST10) and the process returns to the step ST6.

On the other hand, when the absolute value is larger than half of the quantized threshold value (NO, in step ST6), the coefficient count unit 113 counts up the variable number COUNT by one (step ST11). The coefficient count unit 113 determines whether or not the variable number COUNT is larger than a predetermined threshold value TH (step ST12). When the variable count is smaller than the threshold value TH (NO, in step ST12), the process goes to the step ST7, and the quantizing unit 112 quantizes the orthogonal transformation coefficient in accordance with the quantized threshold value.

In the above quantizing steps of the orthogonal transformation coefficient, when the variable number COUNT is larger than the threshold value TH (YES, in step ST12), the coefficient count unit 113 determines that the image data is complicated. Further, the coefficient unit 113 does not perform the quantization of the orthogonal transformation coefficient, and outputs a block completion identifier (EOB) to the quantizing unit 112 (step ST13). Still further, the coefficient count unit 113 determines whether or not there is a next image data block (step ST14). When there is next image data block (YES, in step ST14), the coefficient count unit 113 selects next image block (step ST15), and the process returns to the step ST3.

On the other hand, when there is no next orthogonal transformation coefficient (No, in step ST9), as explained above, the coefficient count unit 113 outputs the block completion identifier (EOB) to the quantizing unit 112 (step ST13). Further, when there is no next image data block (NO, in step ST14), the coefficient count unit 113 outputs a data completion identifier (EOF) to the quantizing unit 112.

As explained above, the image data compression apparatus according to the present invention quantizes the orthogonal transformation coefficients, in order, from the low frequency component. In the above quantizing steps, when an accumulated value of the orthogonal transformation coefficients in which the absolute value exceeds a half of the quantized threshold value (i.e., the accumulation value of the nonzero quantized orthogonal transformation coefficient) exceeds the predetermined threshold value TH, the quantizing means 112 determines that the block image data is complicated, and stops the quantizing operation of the orthogonal transformation coefficient for the high frequency components after the above process.

According to the above structure, when compressing the image data in accordance with the orthogonal transformation process, the quantized threshold values are used commonly for all image data so that it is possible to realize high data compression and to prevent deterioration of the quality of the restored image.

Although the quantizing operation for the orthogonal transformation coefficient at the high frequency components is stopped uniformly in the above embodiment, as another embodiment, it may be possible to retain the orthogonal transformation coefficient having a large absolute value as the valid coefficient after the above stop operation, and to set another orthogonal transformation coefficient except for the above to "zero".

Further, as still another embodiment, it may be possible to retain half of the number of the orthogonal transformation coefficient as the valid coefficient after above stop operation, and set remaining half of the orthogonal transformation coefficient to "zero".

Still further, although the complexity of the block image data is determined based on the accumulation value of the orthogonal transformation coefficient in which the absolute value exceeds half of the quantized threshold value in the above embodiment, it may be possible to employ either a sum of squared values (below, a square-sum) of the orthogonal transformation coefficient or the sum of the absolute of the orthogonal transformation coefficient. Still further, it may be possible to use the sum of the high frequency components after they are weighted.

Figure 6:
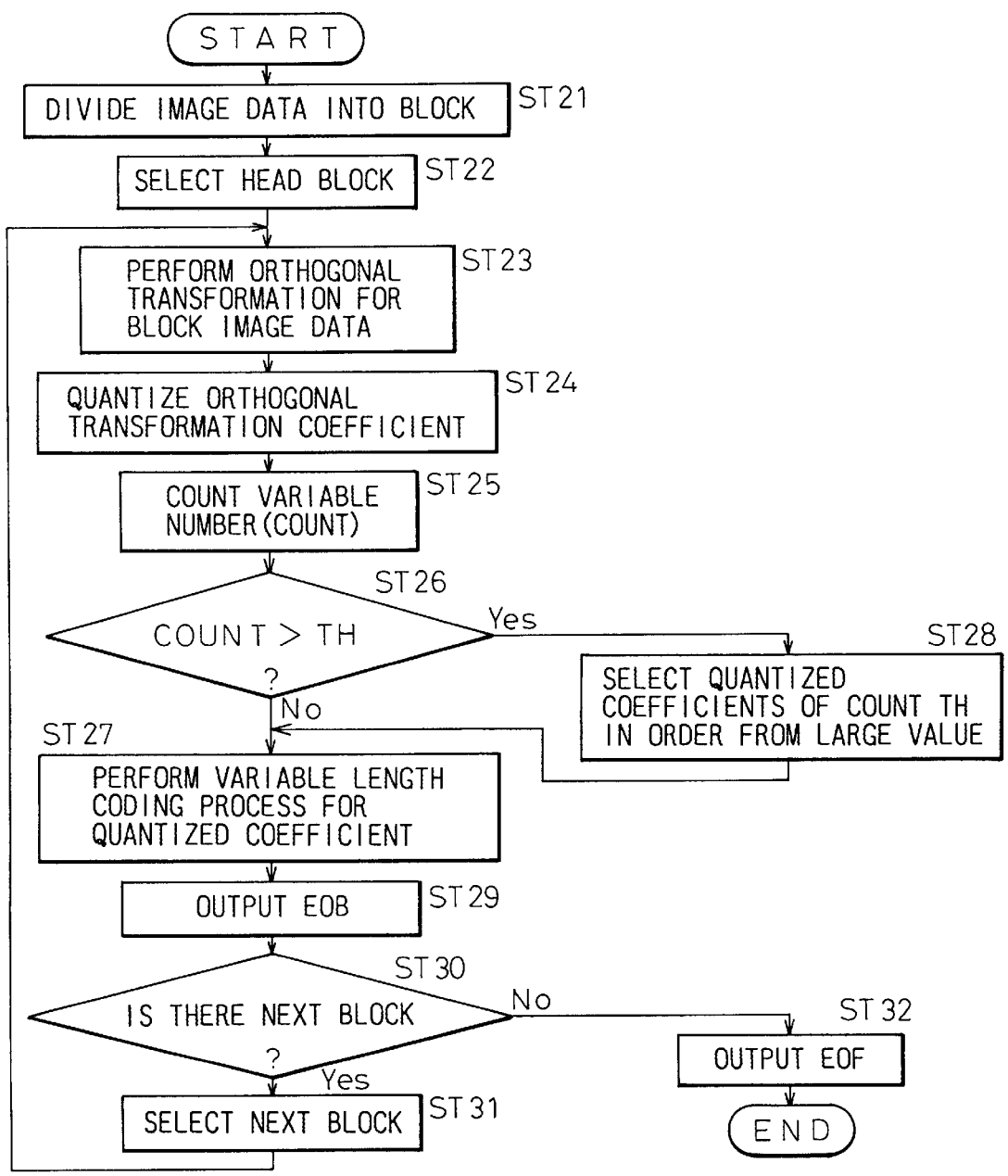
FIG. 6 is a flowchart of operation of the image data compression apparatus according to another embodiment of the present invention.
Figure 7:
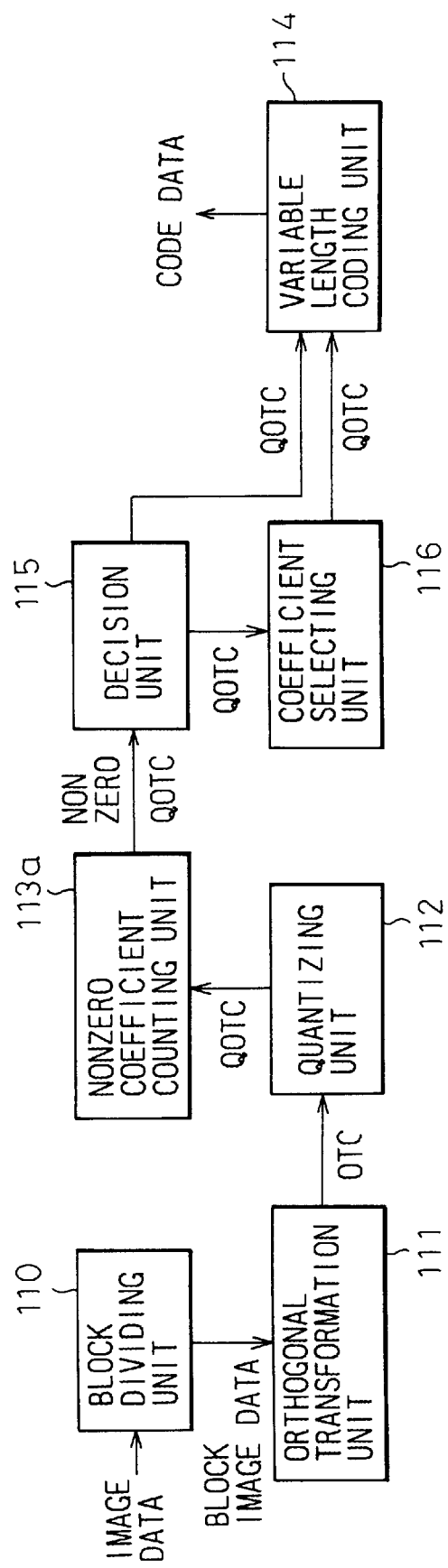
FIG. 7 is a functional view for explaining flowchart shown in FIG. 6.

FIG. 6 is a flowchart of the operation of the image data compression apparatus according to another embodiment of the present invention, and FIG. 7 is a functional view for explaining the flowchart shown in FIG. 6.

The flowchart will be explained with reference to FIG. 7. In the image data compression apparatus, the block dividing unit 110 receives the image data, and divides the image data into a plurality of image blocks (step ST21). Next, the orthogonal transformation unit 111 selects the head image block from the image blocks (step ST22), and performs the orthogonal transformation as to the selected block image data to calculate the orthogonal transformation coefficient OTC (step ST23). Further, the quantizing unit 112 quantizes the orthogonal transformation coefficient (step ST24) to calculate the quantized orthogonal transformation coefficient QOTC (step ST24).

Next, the nonzero-coefficient count unit 113a counts the number of the variable number (COUNT) of the nonzero-quantized orthogonal transformation coefficients which are contained in the selected image data block (step ST25). The decision unit 115 determines whether or not the count of the nonzero-quantized orthogonal transformation coefficient is larger than the predetermined threshold value TH (step ST26).

When the count is smaller than the threshold value TH (NO, in step ST26), the variable length coding unit 114 performs the variable length coding process to the quantized orthogonal transformation coefficient (step ST27). When the count is larger than the threshold value TH (YES, in step ST26), the decision unit 115 determines that the block image data is complicated, and the coefficient selecting unit 116 selects the number of the threshold value TH of the quantized orthogonal transformation coefficient in order from a larger absolute value (step ST28).

Further, the coefficient selecting unit 116 sets the quantized orthogonal transformation coefficient, which is not selected, to zero, and the variable length coding unit 114 uses the quantized orthogonal transformation coefficient which is selected (step ST27).

When the variable length coding unit 114 outputs the block completion identifier (EOB) to the decision unit 115 (step ST29), the decision unit 115 determines whether or not there is a next image block (step ST30). When there is a next image block (YES, in step ST30), the nonzero-coefficient count unit 113a selects the next block (step ST31), and the process returns to the step ST23. When there is no next block (NO, in step ST30), the variable length coding unit 114 outputs the data completion identifier (EOF) to the decision unit 115.

As explained above, in the image data compression apparatus according to the present invention, regarding the block image data in which the number of the quantized orthogonal transformation coefficient indicating a nonzero value exceeds the predetermined threshold value TH, the decision unit 115 determines that the image data block is complicated, and the coefficient selecting unit 116 selects the quantized orthogonal transformation coefficient in order from larger absolute value. Further, the variable length coding unit 114 performs the variable length coding process for the image data block which exceeds the threshold value TH.

When compressing the image data in accordance with the orthogonal transformation, the quantized threshold values are used commonly for all image data so that it is possible to realize high data compression and to prevent deterioration of the quality of the compressed image data.

As explained above, when the decision unit 115 determines that the image data block is complicated, the coefficient selecting unit 116 selects the orthogonal transformation coefficient in order from a larger absolute value. Further, it may be possible to always select the direct current components and the low frequency components in order to maintain a higher quality of the compressed image.

Further, as explained above, although the number of the nonzero quantized orthogonal coefficients is used for determining whether of not the block image data is complicated, it is possible to employ the square-sum of the quantized orthogonal transformation coefficient or the absolute of the quantized orthogonal transformation coefficient. Further, it is possible to sum the high frequency components after they are weighted.

In the image data compression apparatus 1 shown in FIGS. 4 and 6, the compression of the image data is performed by selecting the orthogonal transformation coefficient and the quantized transformation coefficient. Further, when the accumulated values of the code length of the code data are larger than the predetermined threshold value, the decision means determines that the block image data is complicated. When the accumulated values are larger than the threshold value, the code data are deleted by stopping the generation of the code data so that it is possible to compress the code data. Still further, it is possible that half of the code data of the high frequency component are generated and remaining half of the code data are not generated after the above stop.

Further, it is possible to employ a structure applying selection processes for the orthogonal transformation coefficient shown in FIG. 4 to selection processes for the quantized orthogonal transformation coefficient. Still further, it is possible to employ the structure applying selection processes for the quantized orthogonal transformation coefficient shown in FIG. 6 to the orthogonal transformation coefficient.

In the image data compression apparatus 1 shown in FIGS. 4 and 6, when the decision unit determines that the image data block is complicated, the code data are deleted by selecting the predetermined number of the orthogonal transformation and the quantized transformation coefficient. Further, it is possible to employ a method in which a plurality of threshold values for the complexity are determined, and the numbers selected from the orthogonal transformation coefficient and the quantized orthogonal transformation coefficient are changed for every threshold value.

Figure 8:
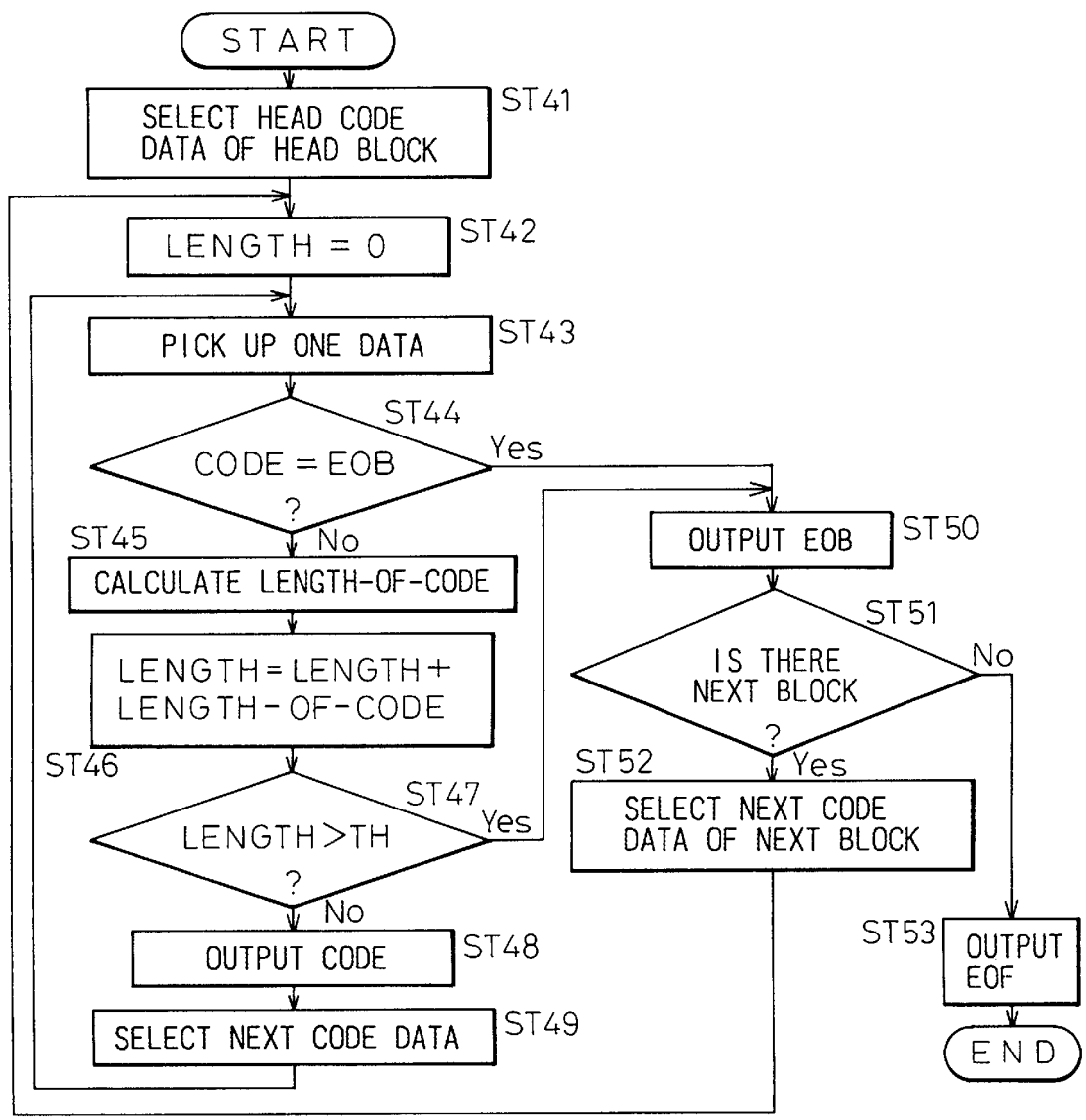
FIG. 8 is a flowchart of operation of the code data compression apparatus according to still another embodiment of the present invention.
Figure 9:
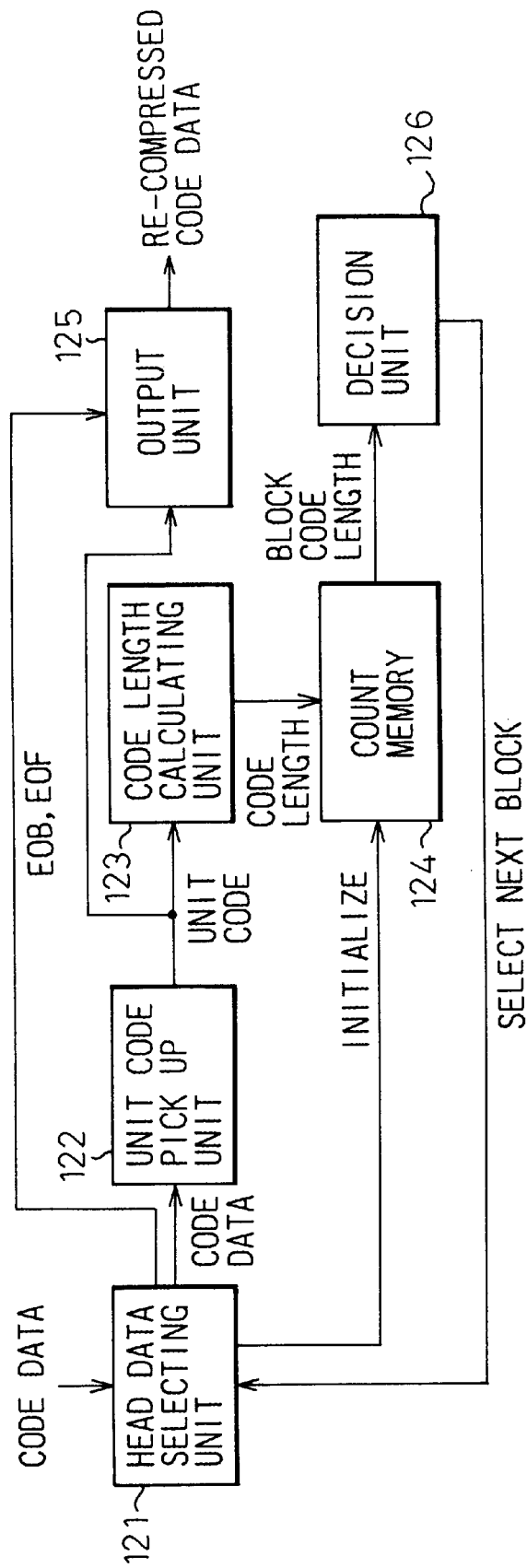
FIG. 9 is a functional view for explaining flowchart shown in FIG. 8.

FIG. 8 is a flowchart of the operation of the code data compression apparatus according to the present invention, and FIG. 9 is a functional view for explaining the flowchart of FIG. 8. The head data selecting unit 121 receives the code data from the image data compression apparatus 1 and selects the first (head) code data in the first block (step ST41). Further, the head data selecting unit 121 sets the variable number (LENGTH) to "zero". The unit code pick up unit 122 (below, pick up unit) picks up one code data (step ST43) from the image data block. The decision unit 126 determines whether or not the one code data indicates the block completion identifier (EOB) (step ST44). When the one code data is not the block completion identifier EOB, the code length calculating unit 123 calculates the code length (LENGTH-OF-CODE) of the one code data (step ST45).

The code length calculating unit 123 adds the calculated code length to the variable number LENGTH, and updates the variable number (LENGTH) (step ST46). The decision unit 126 determines whether or not the variable number LENGTH exceeds the predetermined threshold value TH (step ST47). When the variable number LENGTH does not exceed the predetermined threshold value TH, the output unit 125 outputs the one code data which is picked up without any change (step ST48). Finally, the selecting unit 121 selects next code data (step ST49) and the process returns to the step ST43.

Further, when the variable number LENGTH exceeds the threshold value TH (YES, in step ST47), the decision unit determines that the image data block is complicated, and the output unit 125 outputs the block completion identifier EOB without further output of the code data (step ST50). Next, the decision unit 126 determines whether or not there is a next image block (step ST51). When there is a next image block, the selecting unit 121 selects the head code data of the next block (step ST52) and the process returns to the step ST42. Still further, when the decision unit 126 determines that the picked-up one code data indicates the block completion identifier EOB in step ST44, the output unit 125 outputs the block completion identifier EOB (step ST50). When the decision unit 126 determines that there is no next image block (step ST51), the output unit 125 outputs the data completion identifier EOF (step ST53).

As explained above, in the code data compression apparatus 4, when the output unit 125 outputs the image code which is obtained by compressing the code data in accordance with the JPEG algorithm, the decision unit 126 determines that block image data is complicated when the accumulation value of the code length exceeds the predetermined threshold value TH, and the output unit 125 stops the output of the re-compressed code data after above process. Accordingly, in the code data compression apparatus 4, it is possible to prevent deterioration of the quality of the image code which is coded in accordance with the JPEG algorithm and to realize dense data compression with the high efficiency.

Figure 10:
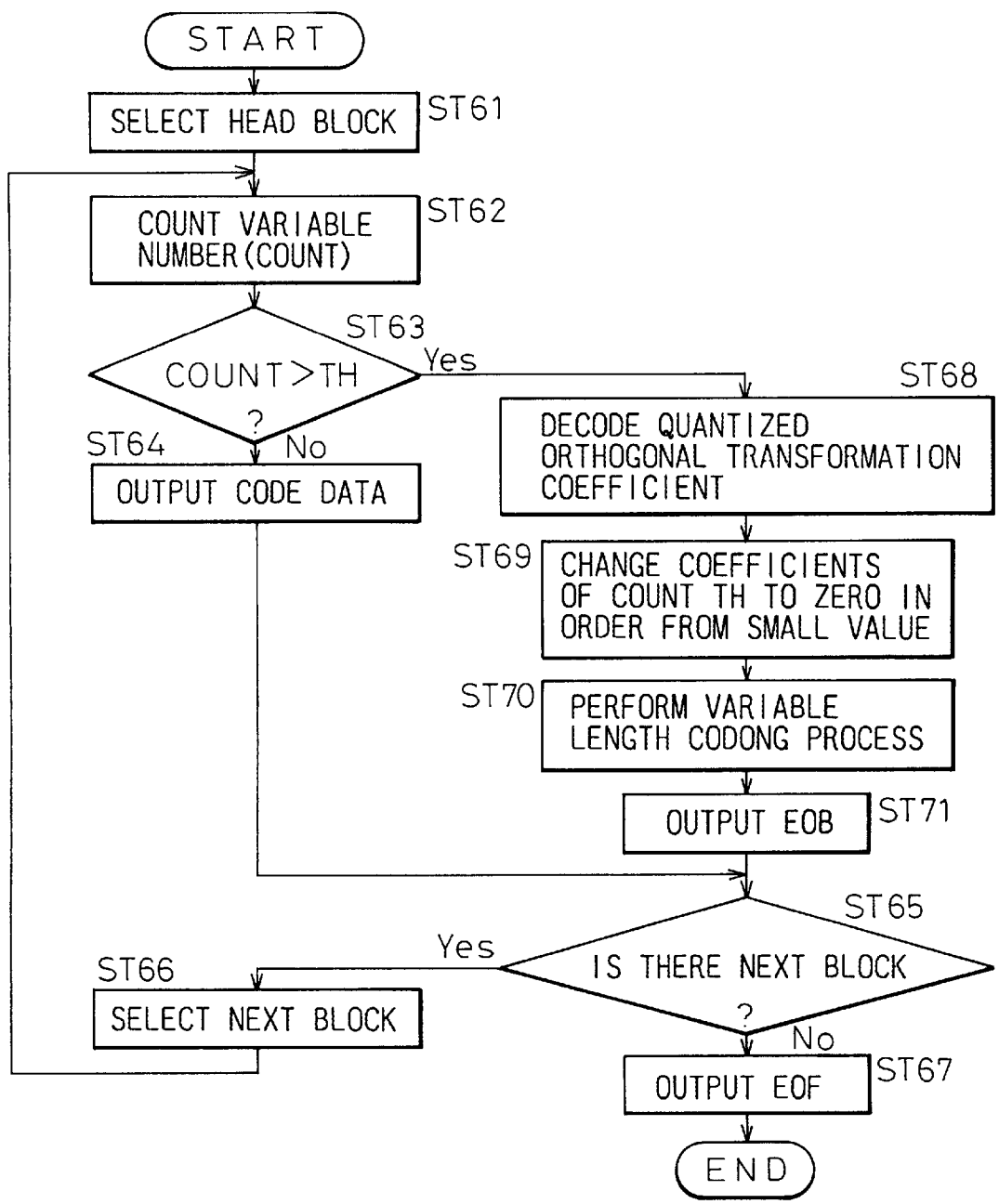
FIG. 10 is a flowchart of operation of the code data compression apparatus according to still another embodiment of the present invention.
Figure 11:
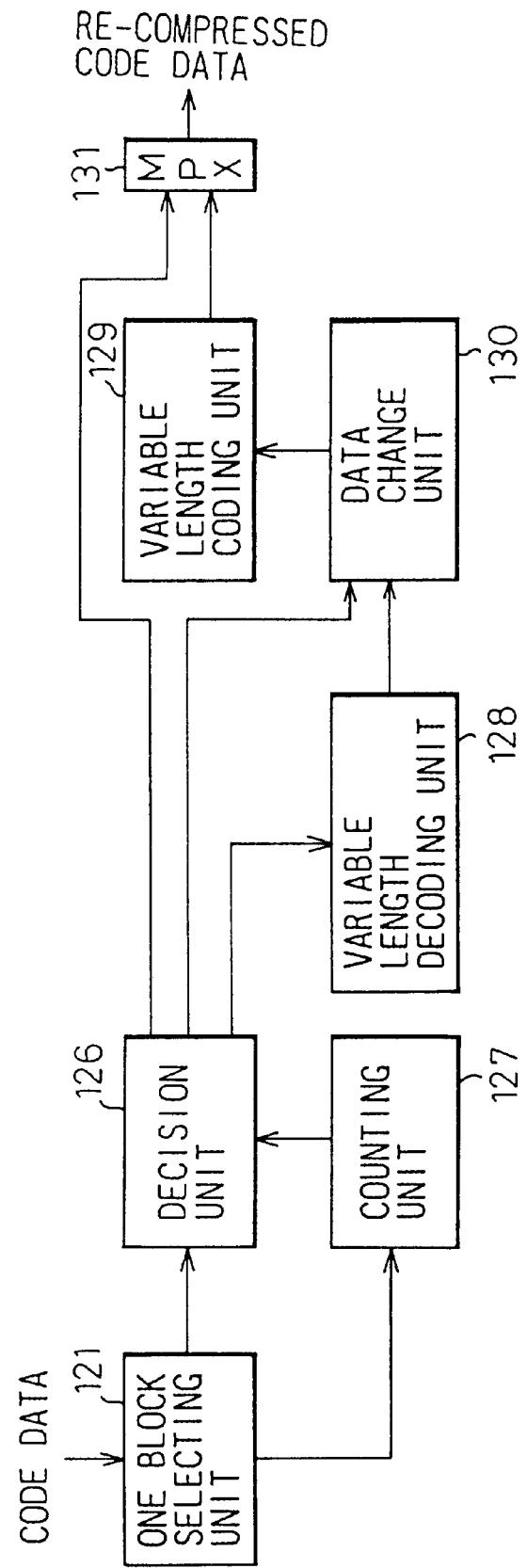
FIG. 11 is a functional view for explaining flowchart shown in FIG. 10.

FIG. 10 is a flowchart of the operation of the code data compression apparatus according to the present invention, and FIG. 11 is a functional view for explaining the flowchart of FIG. 10. First, the block selecting unit 121 receives the code data (step ST61). Next, the nonzero quantized orthogonal transformation coefficient counter unit 127 (below, counter unit) counts the number (COUNT) of the quantized orthogonal transformation coefficients (step ST62). The decision unit 126 determines whether or not the number (COUNT) of the nonzero quantized orthogonal transformation coefficient exceeds the predetermined threshold value TH (step ST63).

When the number (COUNT) is smaller than the threshold value (YES, in step ST63), the decision unit 126 outputs the code data through the multiplexer 131 (step ST64). Further, the decision unit 126 determines whether or not there is a next image data block (step ST65). When there is a next image data block, the block selecting unit 121 selects the next block (step ST66) and the process returns to the step ST62. When there is no next image data block, the variable length coding unit 129 outputs the data completion identifier EOF. Further, when the number of the nonzero quantized orthogonal transformation coefficient exceeds the predetermined threshold value TH (YES, in step 63), the decision unit 126 determines that the code data is complicated. The variable length decoding unit 128 performs an inverted transformation of the variable length coding process to decode the quantized orthogonal transformation coefficient (step ST68).

Further, the selecting unit 121 selects the quantized orthogonal transformation coefficient in accordance with the number which exceeds the threshold value TH in order from the small absolute value, and sets the selected coefficient to zero (step ST69). The variable length coding unit 129 performs the variable length coding process again (step ST70). Further, the variable length coding unit 129 outputs the block completion identifier EOB (step ST71), and the process goes to the step ST65.

In the code data compression apparatus according to the present invention, when the variable length coding unit 129 outputs the image code which is compressed from the code data in accordance with the JPEG algorithm, the decision unit 126 determines that the block image data is complicated when the number of the nonzero quantized orthogonal transformation coefficient exceeds the threshold value TH. The decoding unit 128 decodes the quantized orthogonal transformation coefficient, and selects the predetermined number of the coefficients in order from the large absolute value.

We claim:

1. An image data compression apparatus for compressing image data, said apparatus comprising:

dividing means for receiving the image data and dividing the image data into a plurality of image data blocks;

transformation means, operatively connected to the dividing means, for performing an orthogonal transformation for each image data block and calculating transformation coefficients for every frequency component;

quantizing means, operatively connected to the transformation means, for quantizing the transformation coefficients which are calculated by the transformation means by using a quantized threshold value which is set commonly for all image data, and calculating quantized orthogonal transformation coefficients;

coding means, operatively connected to the quantizing means, for performing a variable length coding process for the quantized orthogonal transformation coefficients which are calculated by the quantizing means, and outputting code data which are compressed from the image data;

detecting means, operatively connected to at least one of above means, for detecting a complexity of the image data block responsive to a number of transformation coefficients which exceed a threshold; and deleting means, operatively connected to at least one of above means and the detecting means, for deleting a transformation coefficient corresponding to a part of the image data block having the complexity detected by the detecting means.

2. An image data compression apparatus as claimed in claim 1, wherein said deleting means deletes a part of the image data block by selecting the transformation coefficients calculated by the transformation means.

3. An image data compression apparatus as claimed in claim 2, wherein said deleting means deletes a part of the image data block by selecting the transformation coefficients by stopping the orthogonal transformation calculating of transformation coefficients executed by the transformation means.

4. An image data compression apparatus as claimed in claim 3, wherein said deleting means selects the transformation coefficients having a high frequency component in accordance with a predetermined reference.

5. An image data compression apparatus as claimed in claim 2, wherein said deleting means deletes a part of the image data block by selecting the transformation coefficients indicating a large absolute value among the transformation coefficients which are calculated by the transformation means.

6. An image data compression apparatus as claimed in claim 5, wherein said deleting means always selects the transformation coefficients having a direct current component and a predetermined low frequency component.

7. An image data compression apparatus as claimed in claim 1, wherein said deleting means deletes a part of the image data block by selecting the quantized transformation coefficients calculated by the quantizing means.

8. An image data compression apparatus as claimed in claim 7, wherein said deleting means deletes a part of the image data block by selecting the quantized transformation coefficients by stopping the quantizing which are executed by the quantizing means.

9. An image data compression apparatus as claimed in claim 8, wherein said deleting means selects the quantized transformation coefficients having a high frequency component in accordance with a predetermined reference.

10. An image data compression apparatus as claimed in claim 7, wherein said deleting means deletes a part of the image data block by selecting the transformation coefficients indicating a large absolute value among the quantized transformation coefficients which are calculated by the quantizing means.

11. An image data compression apparatus as claimed in claim 10, wherein said deleting means always selects the quantized transformation coefficients having a direct current component and a predetermined low frequency component.

12. An image data compression apparatus as claimed in claim 1, wherein said deleting means deletes a part of the image data block by selecting code data generated by the coding means.

13. An image data compression apparatus as claimed in claim 12, wherein said deleting means deletes the image data block by selecting the code data by stopping the coding process which are executed by the coding means.

14. An image data compression apparatus as claimed in claim 13, wherein said deleting means selects the code data having a high frequency component in accordance with a predetermined reference.

15. An image data compression apparatus as claimed in claim 1, wherein said detecting means counts a number of the transformation coefficients in which an absolute value of the transformation coefficient exceeds a threshold value which is set corresponding to the transformation coefficients, and detects the complexity of the image data when the counted value exceeds a predetermined reference value.

16. An image data compression apparatus as claimed in claim 1, wherein said detecting means calculates a sum of n-th power (n being a rational number) of an absolute value of the transformation coefficients, and detects the complexity of the image data when the sum exceeds a predetermined reference value.

17. An image data compression apparatus as claimed in claim 1, wherein said detecting means counts the quantized transformation coefficients in which absolute values of the quantized transformation coefficient exceeds a threshold value which is set corresponding to the quantized transformation coefficients, and detects the complexity of the image data when the counted value exceeds a predetermined reference value.

18. An image data compression apparatus as claimed in claim 1, wherein said detecting means calculates a sum of n-th power (n being a rational number) of an absolute value of the quantized transformation coefficients, and detects the complexity of the image data when the sum exceeds a predetermined reference value.

19. An image data compression apparatus as claimed in claim 1, wherein said detecting means detects the complexity of the image data when a sum of the code length of the code data is larger than a predetermined reference value.

20. An image data compression apparatus as claimed in claim 15, wherein said detecting means uses the absolute values weighted by the frequency when summing the absolute values.

21. A code data compression apparatus for compressing code data, said apparatus comprising:

detecting means for receiving the code data having image data blocks and detecting complexity of the image data blocks responsive to a number of transformation coefficients which exceed a threshold; and deleting means for receiving the code data and deleting a transformation coefficient corresponding to part of the image data blocks having a complexity as detected by the detecting means.

22. A code data compression apparatus as claimed in claim 21, wherein said deleting means retains valid code data which are contained in a predetermined code section in which a direct current component is defined as a start point of the section.

23. A code data compression apparatus as claimed in claim 21, wherein said deleting means does not uniformly delete the high frequency components of the code data, and retains the valid code data having a high frequency component in accordance with a predetermined reference.

24. A code data compression apparatus for compressing code data, said apparatus comprising:

detecting means for receiving the code data and detecting complexity of an image data block of the code data responsive to a number of transformation coefficients which exceed a threshold;

restoring means for receiving the code data and restoring quantized transformation coefficients to the image data block detected by the detecting means;

selecting means operatively connected to the restoring means for selecting the quantized transformation coefficients which are restored by the restoring means; and re-coding means operatively connected to the selecting means for performing a variable length coding process for the quantized transformation coefficients which are selected by the selecting means.

25. A code data compression apparatus as claimed in claim 24, wherein said selecting means selects the quantized transformation coefficient having a large absolute value within the quantized transformation coefficients which are restored by the restoring means.

26. A code data compression apparatus as claimed in claim 25, wherein said selecting means always selects the quantized transformation coefficient having a direct current component and a predetermined low frequency component.

27. A code data compression apparatus for compressing the code data, said apparatus comprising:

detecting means for receiving the code data and detecting complexity of an image data block responsive to a number of transformation coefficients which exceed a threshold;

restoring means for receiving the code data and restoring transformation coefficients to the image data block detected by the detecting means by using a quantized threshold value which is set commonly for all image data;

selecting means operatively connected to the restoring means for selecting the transformation coefficients which are restored by the restoring means;

re-quantizing means operatively connected to the selecting means for quantizing the transformation coefficients which are selected by the selecting means by using the quantized threshold value which are set commonly for all image data; and re-coding means operatively connected to the requantizing means for performing a variable length coding process for the quantized transformation coefficients which are calculated by the re-quantizing means.

28. A code data compression apparatus as claimed in claim 27, wherein said selecting means selects the transformation coefficients having large absolute values within the transformation coefficients which are restored by the restoring means.

29. A code data compression apparatus as claimed in claim 28, wherein said selecting means always selects the transformation coefficients having direct current components and predetermined low frequency components.

30. A code data compression apparatus as claimed in claim 21, wherein said detecting means detects the complexity of the image data block when a sum of the code length of the code data is larger than a predetermined reference value.

31. A code data compression apparatus as claimed in claim 21, wherein said detecting means detects the complexity of the image data block when the number of the quantized transformation coefficients indicating a nonzero value, which is defined by the code data, is larger than a predetermined reference value.

32. An image data compression method, comprising:

determining a complexity level of the image data responsive to a number of transformation coefficients which exceed a threshold;

deleting a transformation coefficient corresponding to a part of the image data responsive to the complexity level; and compressing a remaining part of the image data remaining after the deleting.

33. An image data compression method, comprising:

determining a complexity level of the image data by comparing transformation coefficients for the image data to a coefficient value threshold;

deleting a part of the image data responsive to the complexity level by counting a number of coefficients whose absolute value exceeds the coefficient value threshold and deleting the number above a number threshold; and compressing a remaining part of the image data remaining after the deleting.

34. A code data compression apparatus for compressing code data, said apparatus comprising:

detecting means for receiving the code data having image data blocks and detecting a complexity level of the image data blocks responsive to a number of transformation coefficients which exceed a threshold, wherein the complexity level is a grade of the image data including a light and shade portion and a flat portion of the image data blocks; and deleting means for receiving the code data and deleting a transformation coefficient corresponding to part of the image data blocks having the complexity level as detected by the detecting means.

* * * * *